United States Patent [19]

Bourgeon

[11] Patent Number: 4,688,587
[45] Date of Patent: Aug. 25, 1987

[54] LIQUID TANK AND PROCESS FOR OPERATING IT

[75] Inventor: Michel Bourgeon, Grenoble, France

[73] Assignee: Compagnie Francaise d'Exploitation de Marques-Cofrem, Saint-Pierre des Corps, France

[21] Appl. No.: 549,761

[22] Filed: Nov. 8, 1983

[30] Foreign Application Priority Data

Feb. 4, 1983 [EP] European Pat. Off. ........ 83400242.0

[51] Int. Cl.⁴ ............................................ G01F 23/10
[52] U.S. Cl. .......................................... 137/2; 73/313;
73/DIG. 5; 137/386; 141/1; 141/95; 141/198;
307/118; 361/178
[58] Field of Search ...................... 137/386, 2, 1, 392;
251/65; 73/313, 308, DIG. 5; 141/1, 94, 95,
198; 307/118; 340/625; 361/178

[56] References Cited

U.S. PATENT DOCUMENTS

| | | | |
|---|---|---|---|
| 1,612,017 | 12/1926 | Hastings | 251/65 |
| 2,509,629 | 5/1950 | DeGeirs et al. | 73/313 UX |
| 2,939,072 | 5/1960 | Bell | 73/313 |
| 3,133,233 | 5/1964 | Peterson et al. | 361/178 |
| 3,161,055 | 12/1964 | DeGeirs | 73/313 |
| 3,198,010 | 2/1962 | Huston | 73/313 |
| 3,209,297 | 9/1965 | Kmiecik | 338/33 |
| 3,432,790 | 3/1969 | Svilpe et al. | 73/313 |
| 3,688,795 | 9/1972 | Taylor | 73/DIG. 5 |
| 3,742,342 | 6/1973 | Schick | 73/313 |
| 3,813,941 | 6/1974 | Miguel et al. | 73/313 |
| 3,863,669 | 2/1975 | Ishida et al. | 137/386 |
| 4,305,283 | 12/1981 | Redding | 73/313 |
| 4,326,413 | 4/1982 | Takeshita et al. | 73/313 |
| 4,386,406 | 5/1983 | Igarashi et al. | 73/313 |

FOREIGN PATENT DOCUMENTS

| | | | |
|---|---|---|---|
| 871067 | 1/1952 | Fed. Rep. of Germany . | |
| 1112302 | 3/1956 | France . | |
| 1455459 | 10/1966 | France . | |
| 400978 | 11/1933 | United Kingdom | 73/313 |
| 1006703 | 10/1965 | United Kingdom . | |
| 2029006 | 3/1980 | United Kingdom | 73/DIG. 5 |

Primary Examiner—George L. Walton
Attorney, Agent, or Firm—Sixbey, Friedman & Leedom

[57] ABSTRACT

The liquid tank comprises a container (1) containing a level gauge (3), an element (9) indicating the position of the gauge (3) and located outside the container (1), and a filling duct (2) for the container (1) fitted with an electro-magnetic sluice gate (10), a container (1) with a float (3) which modifies the resistance (9) as a function of its level. The value of the resistance (9) is monitored as a function of the time starting from the start of the filling operation so as to detect any fault inside the container (1).

7 Claims, 2 Drawing Figures

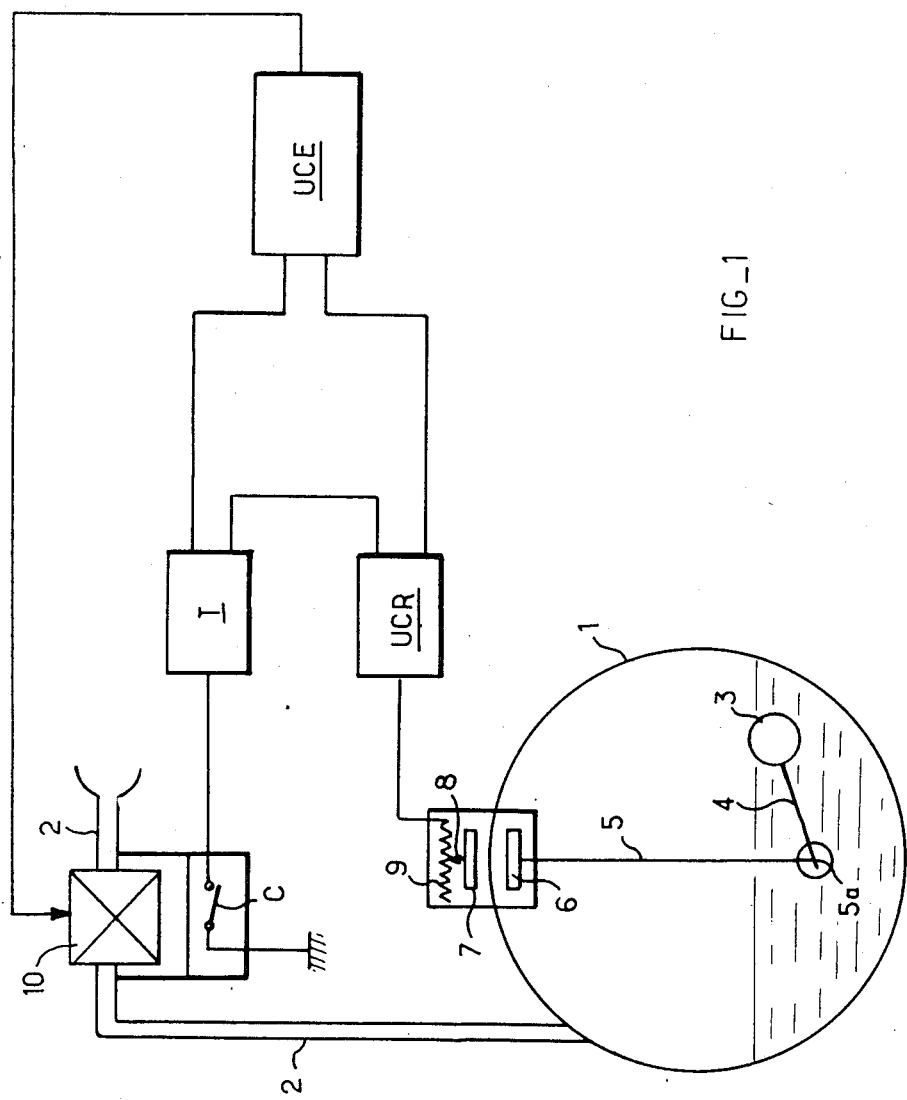
FIG_1

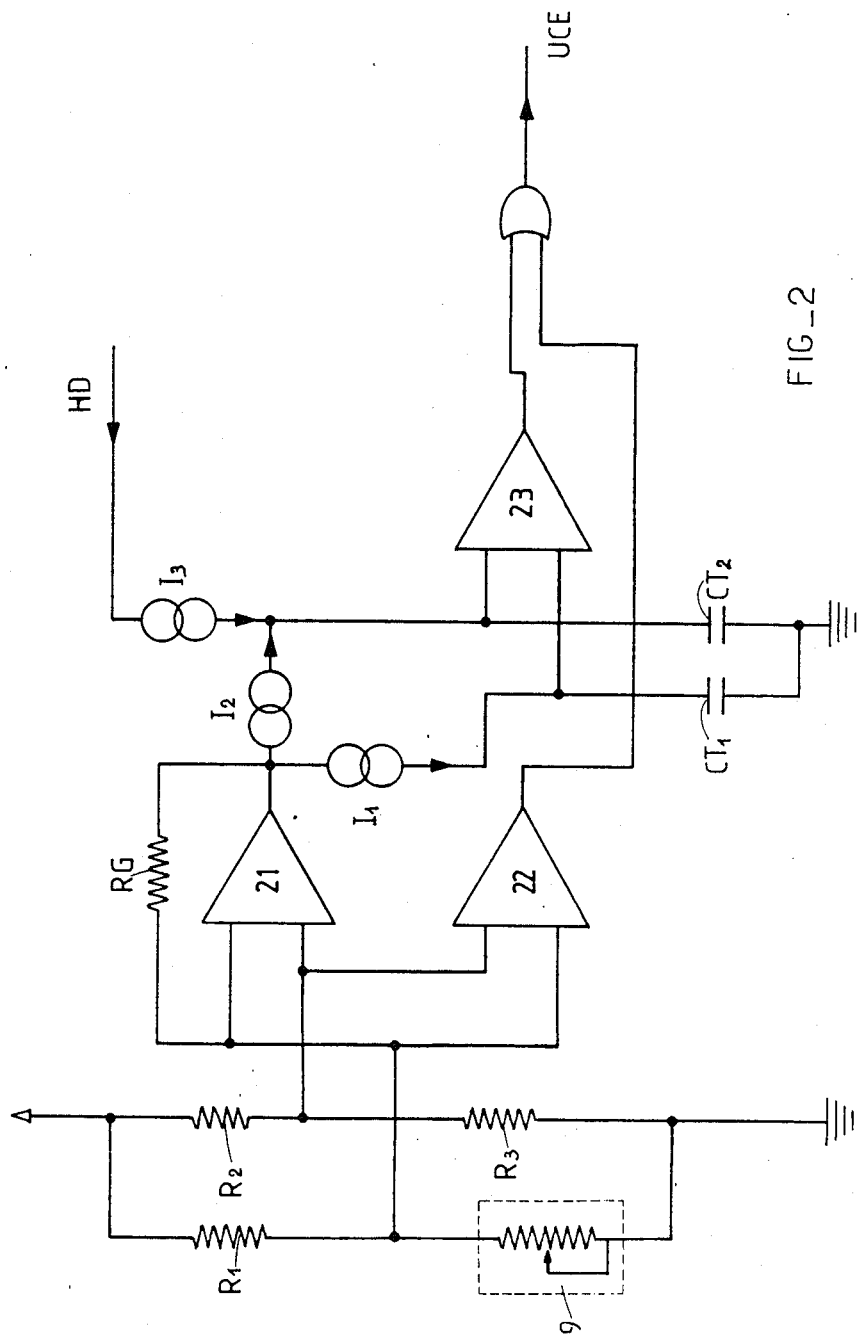
FIG_2

LIQUID TANK AND PROCESS FOR OPERATING IT

This invention relates to liquid tanks and more particularly to tanks for liquified petroleum gas for motor vehicles.

Legislation requires that all L.P.G. tanks for motor vehicles should have a level gauge on the outside of the tank so that the driver can at any time check on the level of fuel remaining.

In order to obtain the required leak-tight seal, the universally adopted solution is a magnetic transmission which is also extremely reliable. The principle is as follows: inside the tank, a free float draws an emitting magnet and outside the tank a receiving magnet positions a needle on a dial and drives a rheostat or some other indicator which enables the indication of the level in the tank to be transmitted to the fuel gauge on the dashboard of the vehicle.

Two very different techniques are used in terms of the safety of filling tanks in motor vehicles.

A. L.P.G. tanks are fitted with an automatic device which does not allow the tank to be filled with the liquid phase above 80 to 85% of the total capacity of the tank, so as to retain a gaseous top which enables the liquid to expand in accordance with temperature variations.

B. The tanks may be 100% filled but are fitted with a safety valve which, in the event of a temperature variation, enables the liquid to expand and be evacuated outside the vehicle.

In the latter case (B), the tanks have five openings receiving, respectively;
 a filling valve with a non-return mechanism;
 a feed start valve with a flow limiter;
 a level gauge with or without a transmitter;
 a safety valve;
 a cock for purging the gaseous phase.

All this is enclosed in a leak-tight casing communicating with the open air on the outside.

The risks involved in such a system have become apparent in the course of use, and unfortunately as a result of accidents. In fact, when a vehicle has just filled up, in winter, for example, then parks in a heated garage underneath a house, the very high coefficient of expansion of the L.P.G. will necessarily cause the safety valve to open and allow the gas to spread around in the area, with all the risks which this involves when the vehicle sets off again.

To remedy these disadvantages, a number of mechanical systems have been produced to date, but they are extremely complicated to produce for a number of reasons. The tank leaves a very restricted passage and does not allow the use of an adequate float; moreover, the factors which occur at the time of filling should also be borne in mind, namely turbulence, counterpressure, surges in the temperature level and differential pressure which may vary considerably as a result of the filling pressures of the distribution pumps which normally vary from 9 to 15 bar, depending on their adjustment. All these factors mean that these apparatus are extremely complicated to produce and are hence very vulnerable and cannot be relied upon completely.

The invention relates to a liquid tank of the type comprising a container which contains a level gauge, an element indicating the position of the gauge, this element being located outside the container, and a filling duct for the container fitted with an electromagnetic sluice gate. Usually, the level gauge and the indicator element are integral with two magnets, respectively, arranged so that their two attracting poles are located opposite each other.

The aim of the invention is to provide a particularly reliable tank which will eliminate accidents caused, in particular, by any failure of the gauge inside the container.

The tank according to the invention is characterised by means for comparing the value of a characteristic of the indicator element with a reference value, means for varying the reference value as a function of the time starting from the opening of the electro-magnetic sluice gate and means for controlling the electromagnetic sluice gate as a function of the result of the comparison.

Thus, the indicator element has a new role. Its characteristic should attain a certain value a certain time after filling has started. If it does not attain it, there is a fault. The electro-magnetic sluice gate closes. The indicator element, which may particularly comprise a rheostat on which the development of resistance as a function of time is checked during the filling operation, indicates not only the level of liquid in the container, but also shows that the internal elements in the container are operating properly.

In view of the eddies, jolts and other turbulence which agitate the liquid and act on the gauge, genarally in the form of a float, and in view of the difficulty of precisely defining the moment at which filling starts and the internal conditions of filling, owing to the play and the initial inertia, it is advisable that closure of the electro-magnetic sluice gate should not be able to occur immediately at the start of filling, at least when the tank is substantially empty. For this reason, the invention is further improved by the fact that the comoarison means are connected to the control means for the electro-magnetic sluice gate via a timer and the comparison means do not give the order to close to the control means for the electro-magnetic sluice gate unless the results of the comparison have never proved satisfactory throughout the timing operation.

The invention is illustrated by FIG. 1 of the accompanying drawings, whilst FIG. 2 is a diagram of the electric circuit.

The L.P.G. tank shown in the drawing comprises a container 1 made of magnetic material provided with a filling duct 2. Inside the tank 1, a float 3 is mounted so as to rise as a function of the level of liquid in the container 1. The float 3 is rotatably mounted by its rod 4 on the axis 5a which drives a permanent magnet 6 via a rod 5.

On the outside of the non-magnetic wall of the container 1, a permanent magnet 7 is rotatably mounted. The south pole of the magnet 6 is opposite the north pole of the magnet 7. The north pole of the magnet 6 is opposite the south pole of the magnet 7. When the magnet 6 rotates as the float 3 rises, the magnet 7 rotates in the same way.

The magnet 7 has a cursor 8 of a rheostat 9 connected to an input of a filling control unit UCR.

One of the outputs from the UCR unit is connected to the input of a timer T which varies the value of a reference resistance as a function of the time from the moment of opening of an electro-magnetic sluice gate 10 controlled by UCE means. The control unit UCE for the electro magnetic sluice gate 10 controls the latter as a function of the results of the comparison of the value of the resistance 9 and the reference resistance.

The output from the filling control unit UCR is connected to an input of the timer T, which is connected to the control unit UCE for the electro-magnetic sluice gate. This latter control unit is connected to the electro magnetic sluice gate 10 which is provided with a differential manocontact C.

The tank operates as follows:

when a filling gun is placed in the filling duct 2, the contact C of the differential manocontact is closed as a result of the differential pressure on either side of the electro magnetic sluice gate 10 which is closed. The closing of this contact C activates the arming of the timer T for a time t.

The filling control unit UCR gives the timer T and the control unit UCE for the electro-magnetic sluice gate the go-ahead to fill up, since the container 1 is empty and therefore the resistance of the rheostat 9 is at its maximum or very low (if the container 9 still contains a little fuel). The control unit UCE for the electro-magnetic sluice gate commands the electro-magnetic sluice gate 10 to open. Filling takes place. The resistance of the rheostat 9 decreases to a predetermined value, corresponding for example to 80% filling, at which point the filling control unit detects this value and commands the UCE unit to close the electro-magnetic sluice gate 10.

If, as a result of a fault, the value of the resistance of the rheostat 9 does not vary or varies less quickly than expected in the course of the filling operation, the UCR unit cancels the permanent resetting of the timer T, which has the effect of cancelling the validation signal of the UCE unit, thereby closing the electro-magnetic sluice gate 10 at the end of the time t starting from the moment at which the fault was detected. This time decreases as filling proceeds.

In FIG. 2, the amplifier 21 amplifies, by a gain G, the deviation in voltage in the branches of the bridge formed by the resistors R1, R2, R3 and 9, and may supply, at its output, two currents I1 and I3 which feed the time comparator.

The threshold comparator 22 swings over when the voltage at the bridge terminals which is caused by the variation in the gauge 9 is equivalent to a threshold of 80% and delivers at its output a signal combined with that of the time comparator 23 which arrests the electro-magnetic sluice gate.

The time comparator 23 compares two time gradients supplied by I1 from the amplifier 21 and I2 owing to the fact that the manocontact C is closed. A third source of current I3 coming from the amplifier 21 is diverted towards I2 so as to accelerate the time gradient as filling proceeds. If, as a result of a fault, the time gradient monitored by C progresses more quickly than the time gradient monitored by the resistor 9, the time comparator 23 will swing over and arrest the electro-magnetic sluice gate.

The electro-magnetic sluice gate is monitored as follows:
either the percentage fullness is attained
or the filling time has run out.

In both cases, the electro-magnetic sluice gate is arrested.

It should be noted that the boosting I3 of the time gradient monitored by I2 from C ensures that the filling time remaining in the event of a fault is substantially nil at the end of the filling operation, i.e. if a fault occurs towards the end of the filling operation the time comparator will immediately arrest the electro-magnetic sluice gate.

I claim:

1. A liquid tank comprising a container containing a level gauge and an indicator element for indicating the position of the gauge, said element being located on the outside of the container, a filling duct for filling the container said duct being fitted with an electro-magnetic sluice gate, means for making a plurality of successive comparisons of the values of a characteristic of the indicator element with reference values, said reference values being indicative of different liquid levels within said tank at points in time, means for varying the reference values as a function of time starting from the moment of opening of the electro-magnetic sluice gate, and means for controlling the electro-magnetic sluice gate as a function of the results of the comparisons to avoid overfilling in the event of a fault.

2. The tank of claim 1, wherein the comparison means are connected to the control means for the electro-magnetic sluice gate via a timer and the comparison means do not give the order to close to the control means for the electro-magnetic sluice gate unless the results of the comparison have never provide satisfactory throughout the timing operation.

3. The tank of claim 2, wherein the timing period decreases as the characteristic value of the indicator element is modified.

4. The tank of claim 1, wherein the indicator element comprises a rheostat the resistance value of which is verified.

5. The tank of claim 1, wherein the comparison means control the closing of the electro-magnetic sluice gate when the value of the characteristics of the indicator element reaches a predetermined threshold.

6. The tank of claim 1, wherein the comparison means can control the opening of the electro-magnetic sluice gate only if the value of the characteristic of the indicator element has returned to a limit which is lower by a given amount than the predetermined threshold.

7. A process for controlling the filling of a liquid tank, said tank comprising a container containing a level gauge, a rheostat indicator element on the outside of the container for indicating the position of the gauge, a filling duct for filling the container and an electro-magnetic sluice gate in said duct for controlling flow therethrough comprising monitoring a plurality of successive values of the resistance of the rheostat as a function of time which elapses from the start of the filling operation, comparing said resistant values with reference values which are indicative of different liquid levels within said tank at points in time, and interrupting the filling operation if the monitored values remain different from the reference values for a predetermined length of time.

* * * * *